United States Patent
Landry et al.

(10) Patent No.: US 11,041,775 B2
(45) Date of Patent: Jun. 22, 2021

(54) PRESSURE TAP SUPPORT FOR TUBE HOLDING DURING WIND TUNNEL TESTING

(71) Applicant: Bell Helicopter Textron Inc., Fort Worth, TX (US)

(72) Inventors: Francois Landry, Saint-Hippolyte (CA); Martin Landry, Prevost (CA); Francis Beaucaire, Piedmont (CA); Kevin Donald Morris, Hawkesbury (CA)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 245 days.

(21) Appl. No.: 16/224,330

(22) Filed: Dec. 18, 2018

(65) Prior Publication Data
US 2020/0191675 A1    Jun. 18, 2020

(51) Int. Cl.
*G01L 19/14* (2006.01)
*F16M 13/02* (2006.01)
*G01L 19/00* (2006.01)

(52) U.S. Cl.
CPC .......... *G01L 19/147* (2013.01); *F16M 13/02* (2013.01); *G01L 19/0023* (2013.01); *G01L 19/0038* (2013.01)

(58) Field of Classification Search
None
See application file for complete search history.

(56) References Cited

U.S. PATENT DOCUMENTS

| | | | |
|---|---|---|---|
| 2004/0065153 A1* | 4/2004 | Lin | G01L 13/02 73/716 |
| 2005/0252299 A1* | 11/2005 | Oda | G01L 19/147 73/715 |
| 2007/0000668 A1* | 1/2007 | Christensen | E21B 19/06 166/380 |
| 2008/0202250 A1* | 8/2008 | Koehler | G01L 19/147 73/756 |
| 2010/0089169 A1* | 4/2010 | Koehler | G01L 19/143 73/756 |
| 2012/0240686 A1* | 9/2012 | Blomberg | G01L 19/0645 73/756 |
| 2014/0360501 A1* | 12/2014 | Guiducci | A61M 16/0883 128/205.23 |
| 2016/0053925 A1* | 2/2016 | Dohi | G01L 9/0051 285/337 |
| 2018/0356310 A1* | 12/2018 | Worth | G01L 19/0636 |

* cited by examiner

*Primary Examiner* — Lisa M Caputo
*Assistant Examiner* — Nigel H Plumb
(74) *Attorney, Agent, or Firm* — Patent Capital Group

(57) ABSTRACT

An apparatus is described and in one embodiment includes a first portion comprising an inner diameter, a first outer diameter, and a first length and a second portion, wherein the first portion and the second portion are integrally connected together, the second portion comprising the inner diameter, at least one second outer diameter, and a second length. The embodiment further includes a flange comprising a contact surface, wherein the inner diameter of the first portion and the second portion provides a hollow pathway through the apparatus.

17 Claims, 11 Drawing Sheets

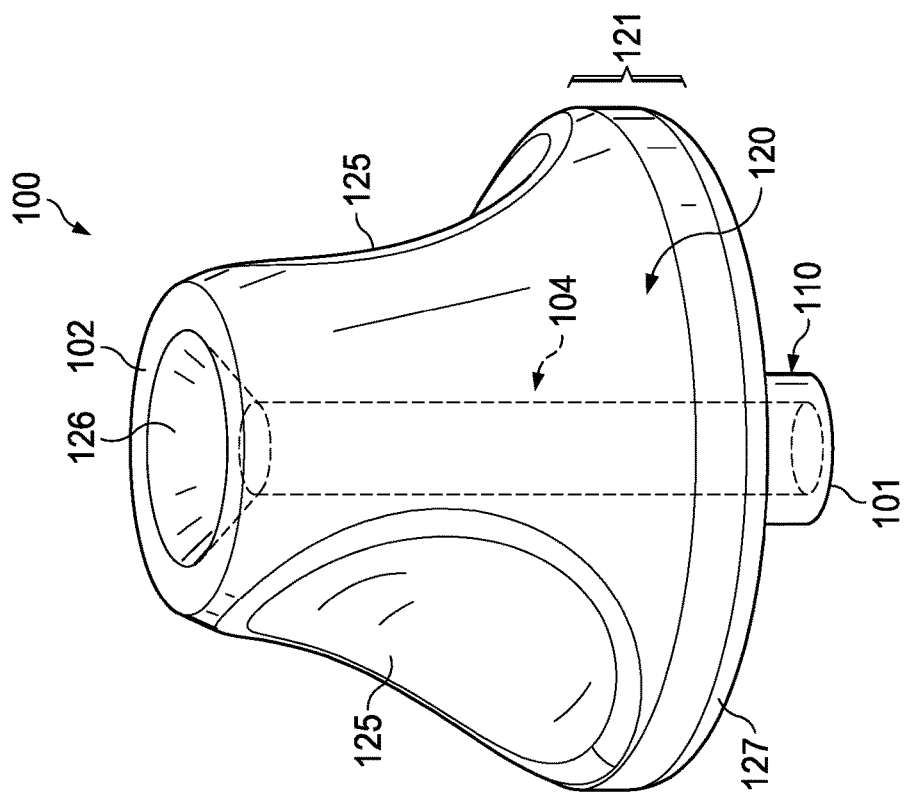
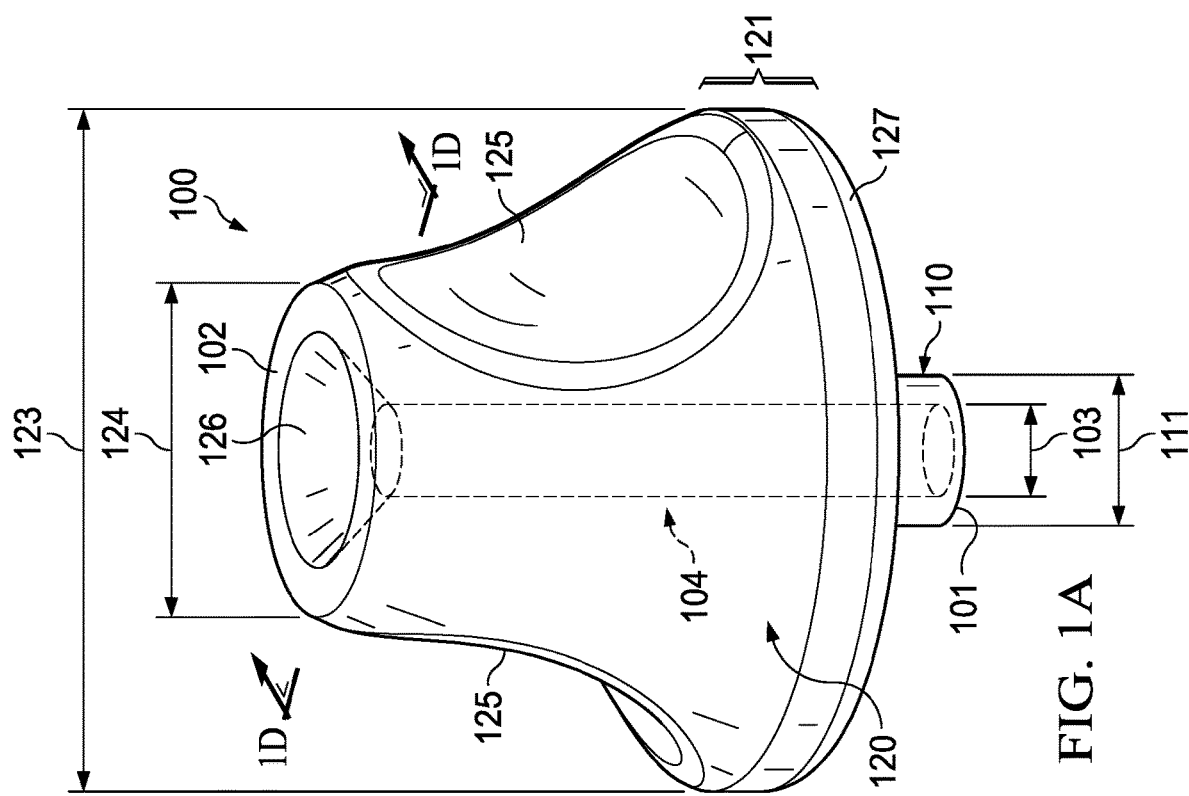
FIG. 1A
FIG. 1B

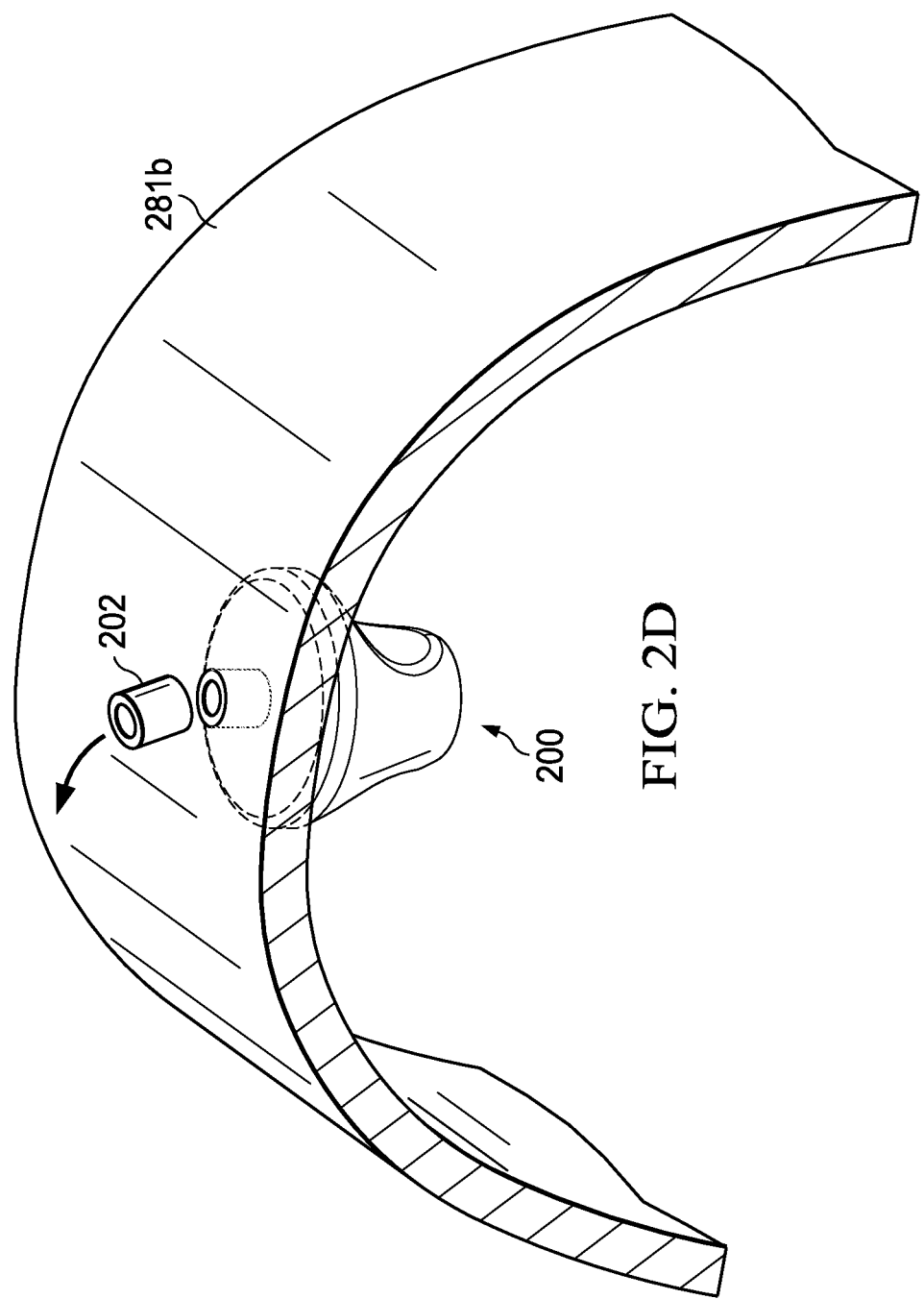

PRESSURE TAP SUPPORT FOR TUBE HOLDING DURING WIND TUNNEL TESTING

TECHNICAL FIELD

This disclosure relates in general to the field of aircraft and, more particularly, though not exclusively, to a pressure tap support.

BACKGROUND

Wind tunnels are often used to measure characteristics of components such as wings, rotor blades, fuselage structures or other components that may be used in aerospace or other applications. In one instance, a model of a component, often referred to as a 'wind tunnel model', is placed in a wind tunnel and air pressure at various points of the model are measured using pressure ports that are provided for the model as air is blown across surface(s) of the model. Typically, hundreds of pressure ports need to be provided for a wind tunnel model, which can implicate numerous time and cost considerations and is often an extremely challenging aspect of wind tunnel testing.

SUMMARY

According to one aspect of the present disclosure, a pressure tap support may be provided and may include a first portion comprising an inner diameter, a first outer diameter, and a first length and a second portion, wherein the first portion and the second portion are integrally connected together, the second portion comprising the inner diameter, at least one second outer diameter, and a second length. The apparatus may further include a flange comprising a contact surface, wherein the inner diameter of the first portion and the second portion provides a hollow pathway through the apparatus.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

FIGS. 1A-1D are simplified diagrams illustrating example details that may associated with a pressure tap support, in accordance with certain embodiments.

FIGS. 2A-2G are simplified diagrams illustrating example details that may be associated with installing a pressure tap support for a wind tunnel model, in accordance with certain embodiments.

DETAILED DESCRIPTION

Figure 1C:
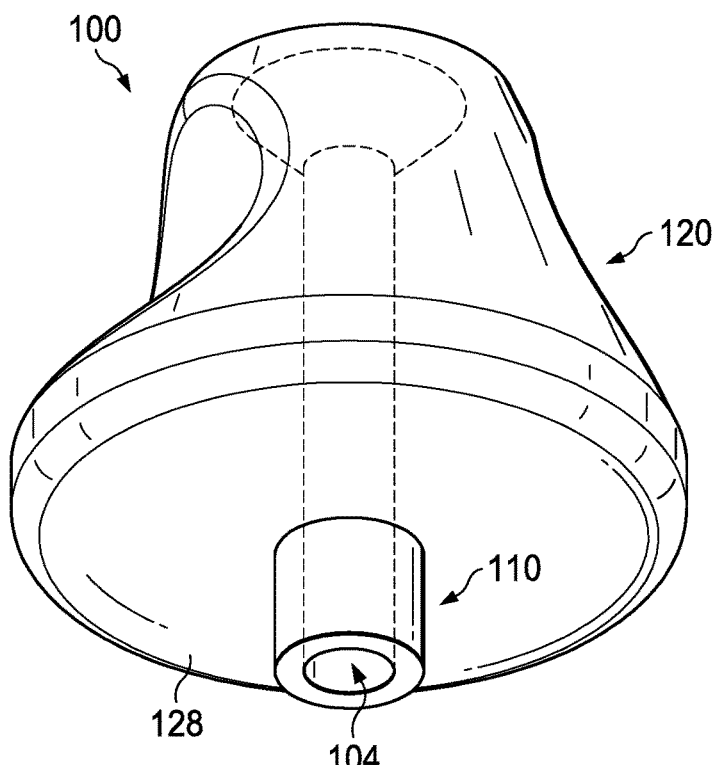

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom', or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase 'between X and Y' represents a range that includes X and Y.

Additionally, as referred to herein in this Specification, the terms 'forward', 'aft', 'inboard', and 'outboard' may be used to describe relative relationship(s) between components and/or spatial orientation of aspect(s) of a component or components. The term 'forward' may refer to a spatial direction that is closer to a front of an aircraft relative to another component or component aspect(s). The term 'aft' may refer to a spatial direction that is closer to a rear of an aircraft relative to another component or component aspect(s). The term 'inboard' may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term 'outboard' may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Wind tunnels are often used to measure characteristics of components such as wings, rotor blades, fuselage structures or other components that may be used in aerospace or other applications (e.g., automotive applications, etc.). For wind tunnel tests, a model of a component, often referred to as a 'wind tunnel model', is placed in a wind tunnel and air pressure at various points of the model are measured using pressure ports that are provided for the model as air is blown across surface(s) of the model. Typically, hundreds of pressure ports need to be provided for a wind tunnel model, which can implicate numerous time and cost considerations and is often an extremely challenging aspect of wind tunnel testing.

For conventional wind tunnel model pressure testing, each pressure port is configured by making a hole in a surface, sometimes referred to as a 'skin', of the model and affixing a rigid tube (e.g., a metal tube) within the hole. The rigid tube is typically affixed within the hole by inserting an end of the tube into the hole from an inner surface of the skin (e.g., from inside the model) and applying an adhesive to the inner surface of the skin and to the rigid tube in order to bond the rigid tube in place at an angle that is approximately 90 degrees normal to the inner surface of the skin and such that the inserted end of the rigid tube is flush with the outer surface of the skin. The configuration of the rigid tube within the hole is referred to a 'pressure port' for the model. Conventional adhesives used for affixing the rigid tubes in the holes can take up to 12 hours to cure, can implicate numerous time and cost considerations. Thus, to ensure a proper fit within a hole, a rigid tube has to be held in place by a person, tape, etc.

Once the adhesive has cured, one end of a flexible tube is connected to the rigid tube within the model and the other end of the flexible tube is connected to a pressure measurement device. Connecting the flexible tube to the rigid tube can sometimes cause the bond between the rigid tube and the skin to break. In particular, models having thin skins can be prone to causing the bond to break. When the bond of a rigid tube is broken, the process of affixing the tube within the hole has to be repeated, which can implicate additional time and cost considerations.

Aside from complexities involved in bonding rigid tubes within wind tunnel models, forming hundreds of holes in the skin(s) of wind tunnel models can also implicate numerous time and cost considerations. Given the number of holes that may be needed, it is preferable to make the holes using automated drilling machines such as computer numerically controlled (CNC) machines. However, the rigid tubes used for wind tunnel pressure testing can often have diameters of less than 0.063 inches. It is difficult to form holes of diameters less than 0.063 inches using automated drilling machines, particularly for skins made of composite materials, as the bits used to make such small diameter holes easily break during automated drilling processes. Thus, such small diameter holes typically have to be hand drilled by a person, which can increase time and/or costs for wind tunnel pressure tests.

Teachings of embodiments discussed herein describe pressure tap supports that facilitate configuring the rigid tubes for pressure ports that may provide both support for the rigid tube that is to be inserted into a pressure port hole and may also provide an interface for bonding to the inner surface of a skin that is larger and easier to manipulate than the rigid tube itself. As referred to herein in this specification, the configuration of a pressure tap support and a rigid tube installed within a hole of a skin of a wind tunnel model (with or without a flexible tube connected to the rigid tube) may provide a pressure port for the wind tunnel model. Pressure tap supports discussed for various embodiments described herein may reduce time and/or costs for wind tunnel pressure testing in comparison to more conventional techniques that involve bonding the rigid tubes directly to pressure port holes.

In at least one embodiment, a pressure tap support may include: a first portion having an inner diameter, a first outer diameter, and a first length; and a second portion having the inner diameter, at least one second outer diameter, a second length. The first portion and the second portion of the pressure tap support are integrally connected together to form a single, unitary device. The second portion of the pressure tap support includes a flange that provides a contact surface that can be affixed to the inner surface of a skin of a wind tunnel model. The inner diameter of the first and second portions provides a hollow pathway for the pressure tap support through which a rigid tube can be inserted.

The first outer diameter of the first portion is larger than the outer diameter of the rigid tube that is to be inserted through the pressure tap support; thus, holes provided in the skin(s) of a wind tunnel model can be made larger, which may facilitate the use of automated drilling machines, thereby, reducing costs and/or time of forming the holes. The contact surface of the flange provides a larger bond area than that of a rigid tube and quick-drying adhesives, such as epoxy adhesives that may form bonds in less than 5 minutes, may be used to affix the pressure tap supports within a wind tunnel model, which can further reduce costs and/or time for wind tunnel pressure testing. Accordingly, embodiments described herein may advantageously provide for the ability to reduce the time to configure a pressure port for a wind tunnel model from an hour or more (depending on adhesive cure time, bond breakage, etc. that is typically involved in conventional pressure port configuration), to potentially five minutes or less. Further, hole drilling for pressure tap supports as discussed herein can be automated (e.g., due to bigger diameter holes), which can provide further time and cost savings. When considered over the hundreds of potential pressure ports that may need to be configured for a wind tunnel model, pressure tap supports as discussed herein may provide tremendous time and cost savings for preparing models for wind tunnel testing.

Figure 1D:
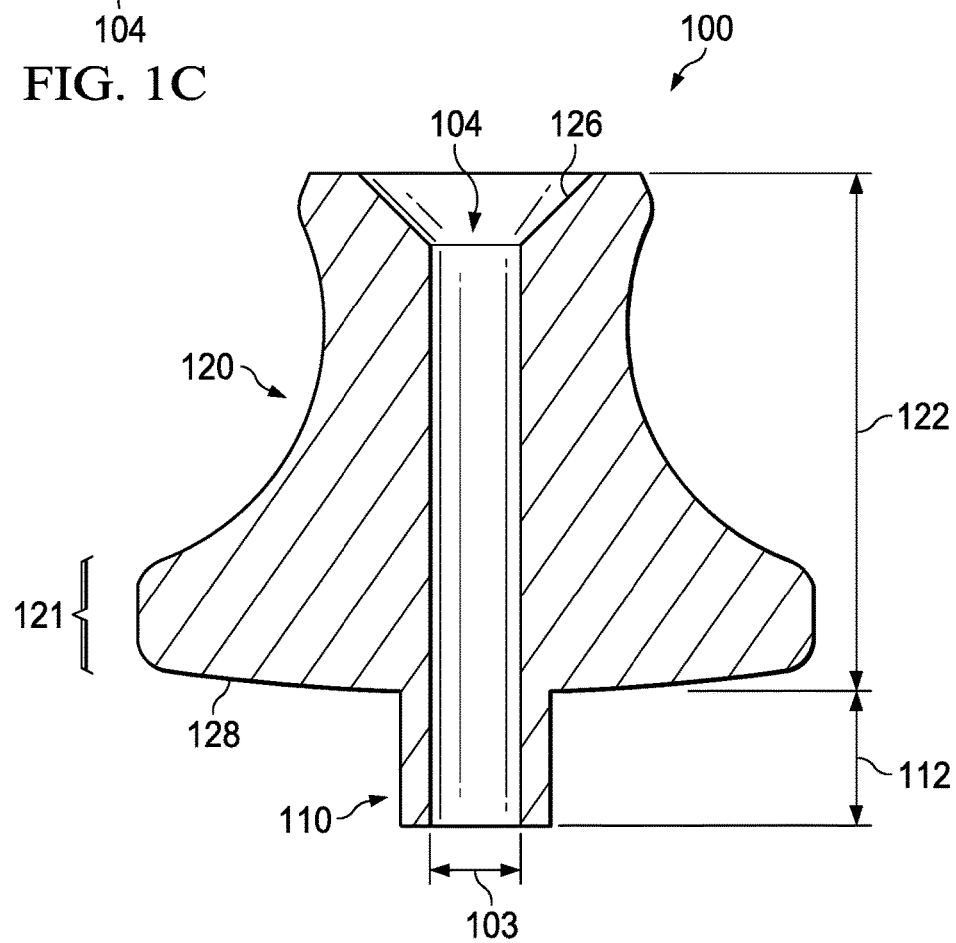

Referring now to FIGS. 1A-1D, FIGS. 1A-1D illustrate example embodiments that may be associated with an example pressure tap support 100, in accordance with certain embodiments. In particular, FIG. 1A is a simplified perspective view of pressure tap support 100, FIG. 1B is another simplified perspective view of pressure tap support 100, FIG. 1C is a simplified bottom perspective view of pressure tap support 100, and FIG. 1D is a simplified side, cross-sectional view of pressure tap support 100, in accordance with certain embodiments. The cross-section of FIG. 1D is generally cut along the lines labeled '1D' in FIG. 1A. Features of pressure tap support 100 illustrated in FIGS. 1A-1D are discussed herein collectively.

In at least one embodiment, pressure tap support 100 may have a first portion 110, also referred to herein interchangeably as a 'tap portion' 110, and a second portion 120, also referred to herein interchangeably as a 'support portion' 120. The tap portion 110 is provides a bottom end 101 for the pressure tap support 100 and the support portion provides a top end 102 for the pressure tap support 100. The tap portion 110 and the support portion 120 of the pressure tap support 100 may include an inner diameter 103 that provides a hollow pathway 104 through the pressure tap support 100 in which a tube can be inserted. For example, during configuration of a pressure tap support for a given wind tunnel model, a rigid tube can be inserted through the hollow pathway of the pressure tap support to a particular distance and bonded to the pressure tap support.

The tap portion 110 includes an outer diameter 111 and a length 112 (as shown at least in FIG. 1D). The outer diameter 111 may have any suitable size depending on the diameter of the pressure port hole in which the tap portion is to be inserted in order to provide a flush fit of the tap portion 110 within the hole. In some embodiments, the outer diameter 111 of the tap portion 110 may be suitably sized to fit into more than one outer diameter hole size (e.g., the tap portion 110 may be sized to fit flush for certain hole diameters and may be made a compressive material such that the tap portion 110 can also be pushed into smaller diameters).

The length 112 of the tap portion 110 can be any suitable size. In some embodiments, the tap portion length 112 may be sized to be approximately equal to the thickness of the wind tunnel model skin for which the pressure tap support is to be used. However, given the variations in skin thicknesses for different models, tolerance variations, or the like, it may be advantageous in some embodiments to configure the tap portion length 112 to be greater than a certain maximum skin thickness such that the pressure tap support can be used with a range of skin thicknesses. Any excess length of the tap portion 110 that extends beyond outer surface of a skin can be removed (e.g., cut, shaved, etc.) to be flush with the outer surface of the skin.

The support portion 120 may include one or more outer diameters and a length 122 (as shown at least in FIG. 1C). The support portion 120 may include a flange 121 that provides a contact surface 128 (as shown at least in FIG. 1C) for affixing the pressure tap support 100 to an inner surface of a skin of a wind tunnel model (not shown). The length 122 of the support portion 120 may be any suitable size that facilitates an area to grab or grip the support portion 120 for installing the pressure tap support 100 within a wind tunnel model and also that facilitates providing support for a tube inserted in the hollow pathway 104 through the pressure tap support. In at least one embodiment, the length 122 may be 0.5 inches; however, other lengths (longer or shorter) can be envisioned depending on applications and/or implementations. The combined lengths of the support portion 120 and of the tap portion 110 may provide an overall length (not labeled) for the pressure tap support.

In some embodiments, the support portion 120 may include one or more ergonomic features, such as gripping features 125, that may provide an improved gripping surface for the support portion 120 to be gripped between at least two fingers of a person during positioning and/or affixing the pressure tap support 100 within a pressure port hole. For example, the gripping features 125 and/or any other ergonomic features can provide the ability to push, pull, and/or rotate the pressure tap support 100 during installation.

In still some embodiments, the support portion 120 may include one or more usage features configured at the top end 102 of the pressure tap support 110, such as bevel or chamfer features 126, that may provide a guide for channeling, directing, or otherwise helping to funnel a tube (and potentially adhesive) into the hollow pathway 104 of the pressure tap support 100 and/or may provide an enlarged area to receive adhesive to affix or bond the tube to the pressure tap support (e.g., a bead of adhesive may be applied in the chamfer features 126 once the tube is inserted to a particular distance within the pressure tap support). In still some embodiments, the support portion 120 may include one or more bevel or chamfer features 127 configured for the flange 121 that may provide an area to receive adhesive to affix or bond the pressure tap support 100 to the inner surface of a skin.

For the embodiments of FIGS. 1A-1D, support portion 120 includes a first outer diameter 123 configured for the flange 121 and a second outer diameter 124 configured at the top end 102 of the pressure tap support 100. Thus, support portion 120 for the embodiments of FIGS. 1A-1D may have top-to-bottom sloping features, which may also provide improved gripping features for the pressure tap support 100. In some embodiments, however, the support portion 120 may only have one outer diameter and may or may not combine one or more other features as discussed herein (e.g., gripping features 125, chamfer features 126, etc.) into the support portion. In still other embodiments, the support portion 120 may have more than two outer diameters and may or may not combine one or more other features as discussed herein into the support portion.

In some embodiments, ergonomic features (e.g., gripping features 125) may be configured on opposite sides of the support portion 120 (as shown for the embodiments of FIGS. 1A-1D); however, in other embodiments, gripping features may be configured around the entirety of the support portion 120. Other variations for gripping or other ergonomic features can be envisioned for a pressure tap support within the scope of the teachings of the present disclosure and, thus, are clearly within the scope of the present disclosure.

Turning to FIGS. 1C-1D, features associated with contact surface 128 of flange 121 are illustrated. In some embodiments, the flange 121 may be configured such that the contact surface 128 may be flat as it extends outward from the tap portion 110 to an outer diameter (e.g., outer diameter 123) of the support portion 120. In some embodiments, however, the flange 121 may be configured such that the contact surface 128 may curved as it extends outward from the tap portion 110. A curved contact surface for the flange may improve the ability to install and use pressure tap supports within models having curved and/or angled skins or features. In some embodiments, the flange may be configured with a curve that can be used for a range of curve radii.

In some embodiments, the flange 121 may fully encircle the outer diameter 111 of the tap portion 110 (as shown in the embodiments of FIG. 1A-1D), however, in other embodiments, the flange 121 may include one or more flange portions that extend outward from one or more portions of the tap portion 110. For example, for cases in which a pressure tap support is to be inserted in a hole at an interior corner of a wind tunnel model, the flange may be configured to encircle any part of the tap portion that may be sufficient for affixing the pressure tap support to the inner surface of the wind tunnel model.

In various embodiments, pressure tap supports (e.g., pressure tap support 100) may be composed of one or more materials including, polymers (e.g., plastic, nylon, rubber, etc.), composite materials (e.g., carbon fiber), metals, metal alloys, combinations thereof, or the like. In various embodiments, pressure tap supports may be fabricated using 3D printing techniques, injection molding techniques, combinations thereof, or the like.

Other variations for pressure tap support features that may be configured for different applications and/or implementations can be envisioned within the scope of the teachings of the present disclosure and, thus, are clearly within the scope of the present disclosure.

Referring now to FIGS. 2A-2G, FIGS. 2A-2G are simplified diagrams illustrating example details that may be associated with installing a pressure tap support 200, in accordance with certain embodiments. For the embodiments of FIGS. 2A-2G, the pressure tap support 200 includes a tap portion 202, a support portion 204, and an inner diameter (not labeled) that provides hollow pathway 205 from the top end to the bottom end of the pressure tap support 200. The support portion is configured with a curved flange 206 to provide a curved contact surface 208. Further for the embodiments of FIGS. 2A-2G, a portion of a wind tunnel model skin 280 is illustrated in which the skin 280 is curved and includes an inner surface 281a and an outer surface 281b. A pressure port hole 282 is provided for the skin 280.

Various features (e.g., diameters, ends, lengths, etc.) are discussed for the pressure tap support 200 of the embodiments of FIGS. 2A-2G that may not be labeled in the figures; however, it is to be understood that these features may correspond to similar features as discussed above for the pressure tap support 100 of FIGS. 1A-1D. In particular, the tap portion 202 of pressure tap support 200 is configured to have an outer diameter that is suitable to fit flush within the outer diameter of the hole 282 provided for skin 280. For the embodiments of FIGS. 2A-2G, the length of the tap portion 202 is configured to be greater than the thickness of the skin 280.

Figure 2A:
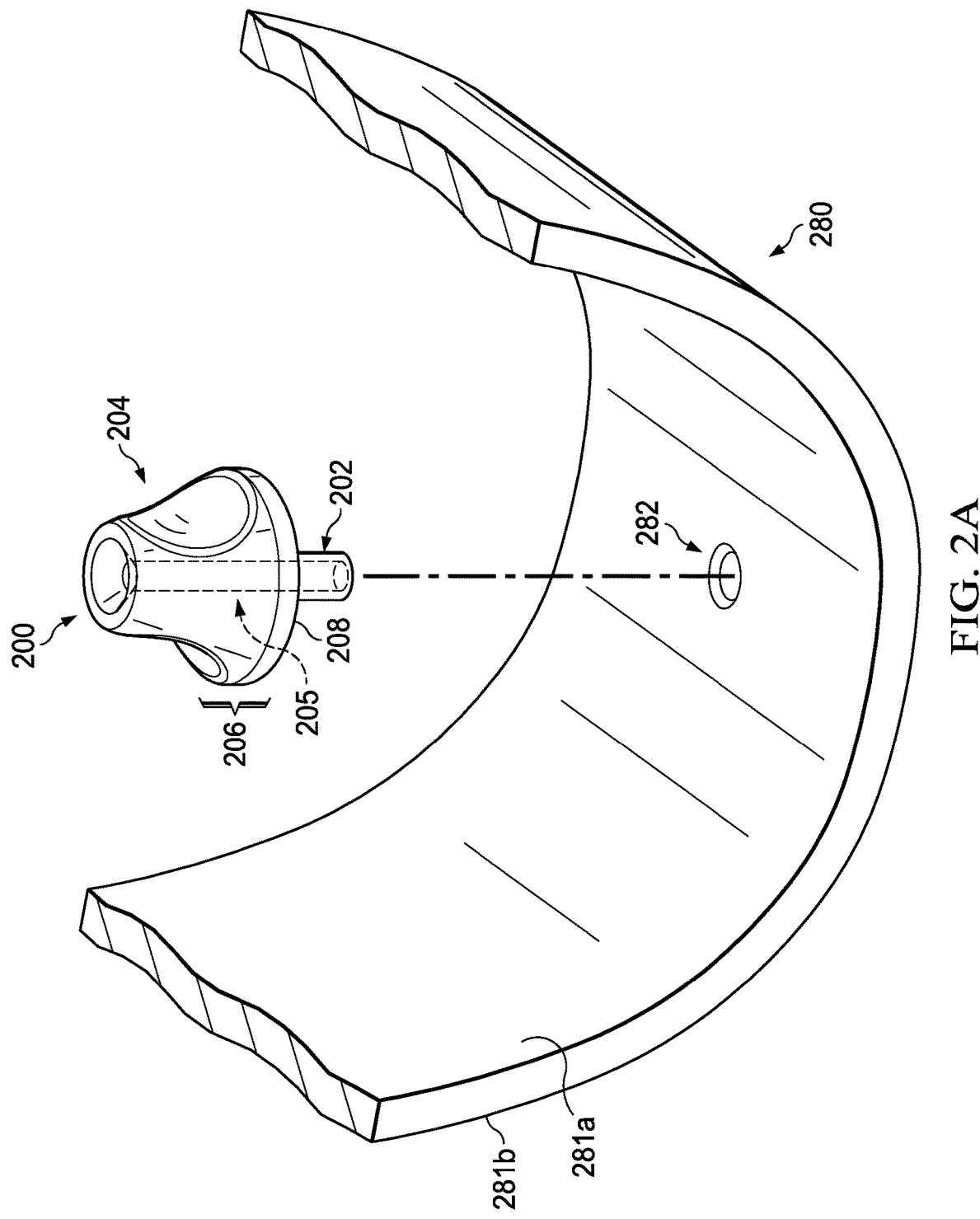
Figure 2B:
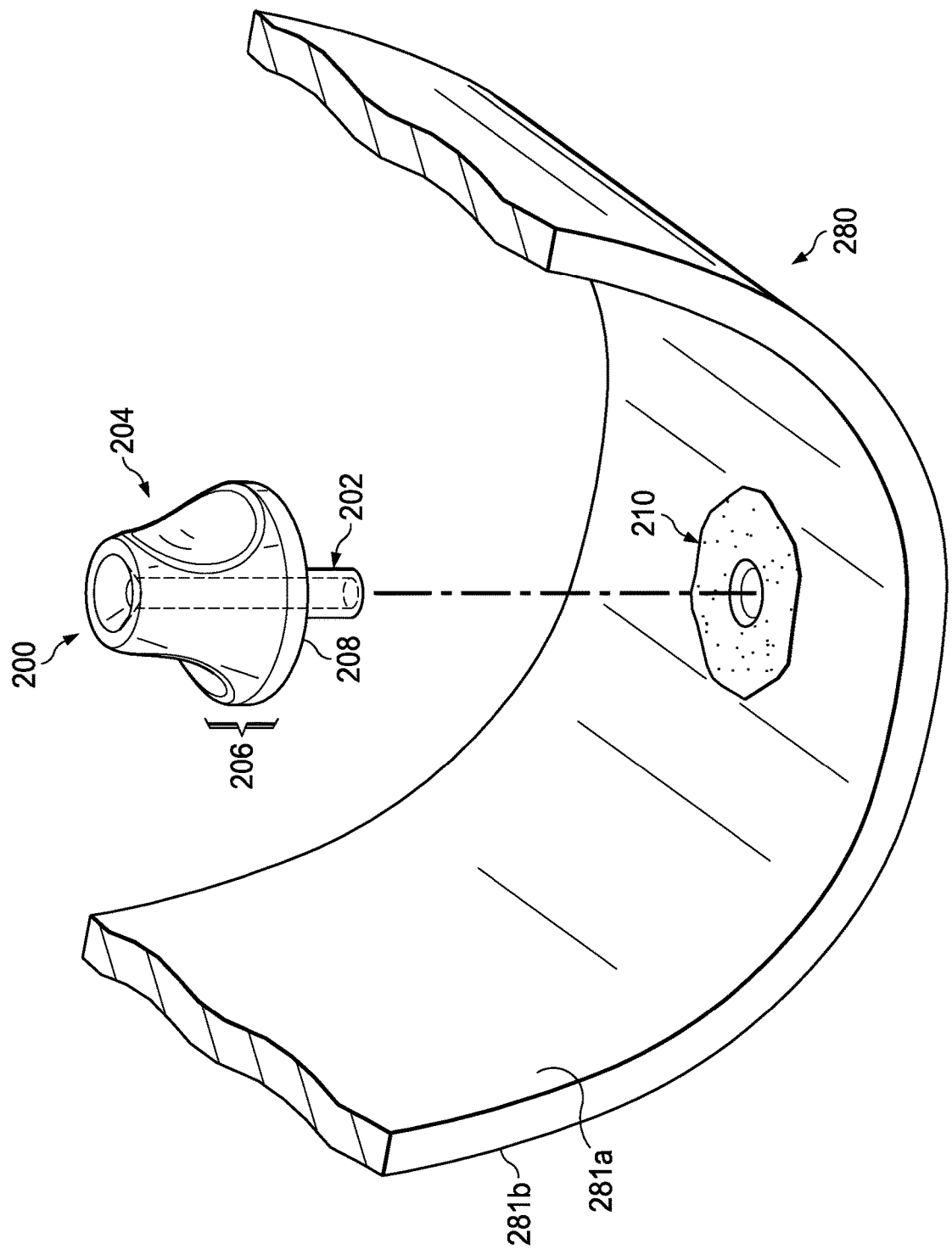
Figure 2C:
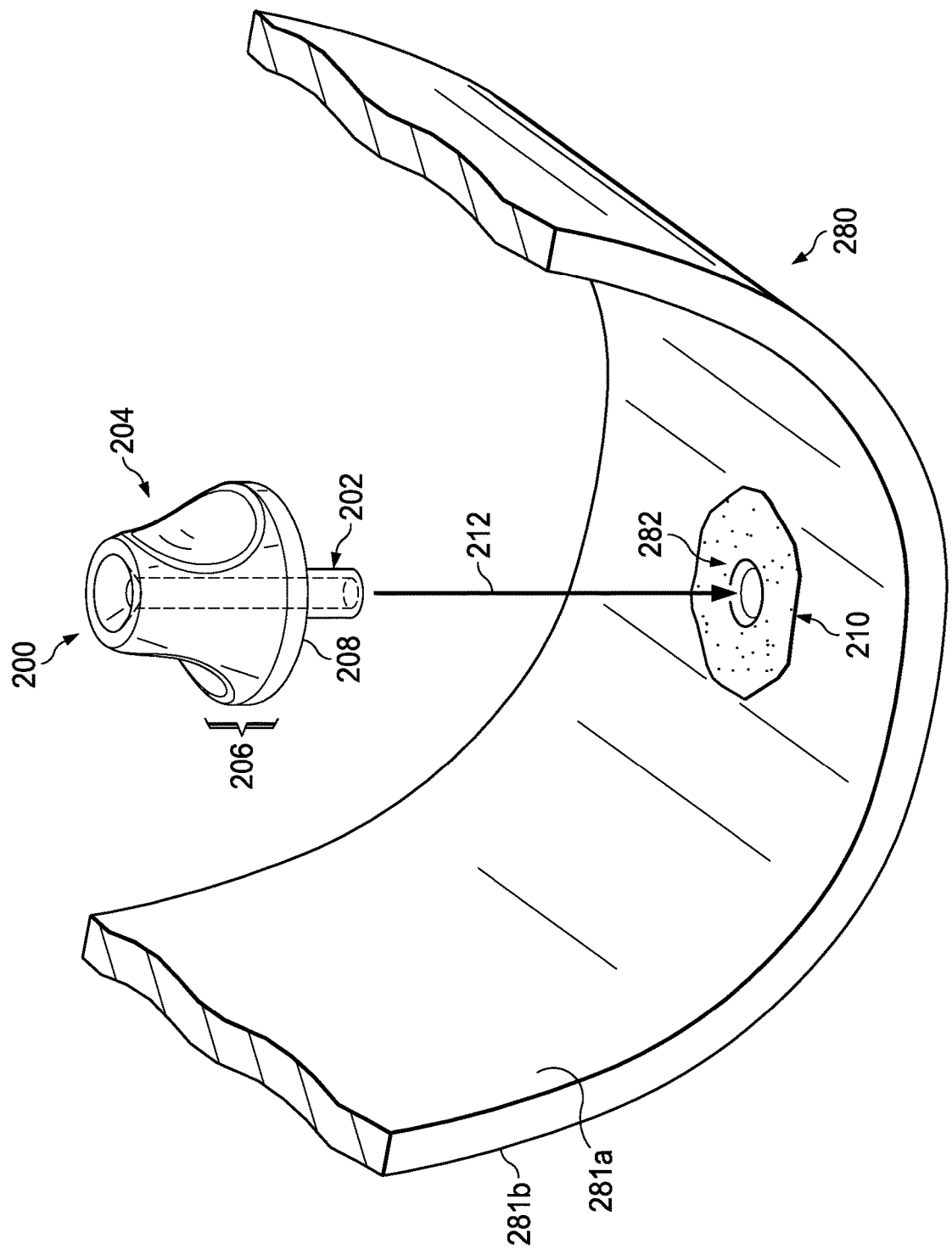

Referring to FIG. 2B, an adhesive 210 can be applied to any combination of the inner surface 281a of the skin 280, the contact surface 208 of the flange 206, the outer diameter of the tap portion 202, and/or the outer diameter of the hole 282. Referring to FIG. 2C, the pressure tap support 200 is inserted (212) in the hole 282. In some embodiments, additional adhesive 210 can be applied along the outer diameter of the support portion flange 206 and the inner surface 281a of the skin 280 after the pressure tap support 200 is inserted in the hole 282. In some embodiments, the pressure tap support 200 may be held in-place for a suitable time to allow the adhesive 210 to harden and/or cure.

Other variations can be envisioned. For example, although the order of operations in FIGS. 2B-2C illustrates applying an adhesive and then inserting the pressure tap support, in some embodiments the order can be reversed. For example, the pressure tap support 200 could first be inserted in the hole 282 and then adhesive applied along the outer diameter of the support portion flange 206 in order to affix the pressure tap support 200 to the skin 280.

Turning to FIG. 2D, any excess length of the tap portion 202 extending beyond the outer surface 281b of the skin 280 is removed (e.g., cut, trimmed, shaved, etc.) such that the bottom end of the pressure tap support 200 is flush or even with the outer surface 281b of the skin 280. In some cases, it may be advantageous to remove any excess material of the tap portion of a pressure tap support before inserting a rigid tube into the pressure tap support in order to minimize the possibility of contaminating the inside of the pipe with material removed from the tap portion. However, in some cases excess length of the tap portion of a pressure tap support and any excess length of a pipe inserted in the pressure tap support may be removed together at a same time such that both the tap portion and the pipe are even with the outer surface of a skin.

Figure 2E:
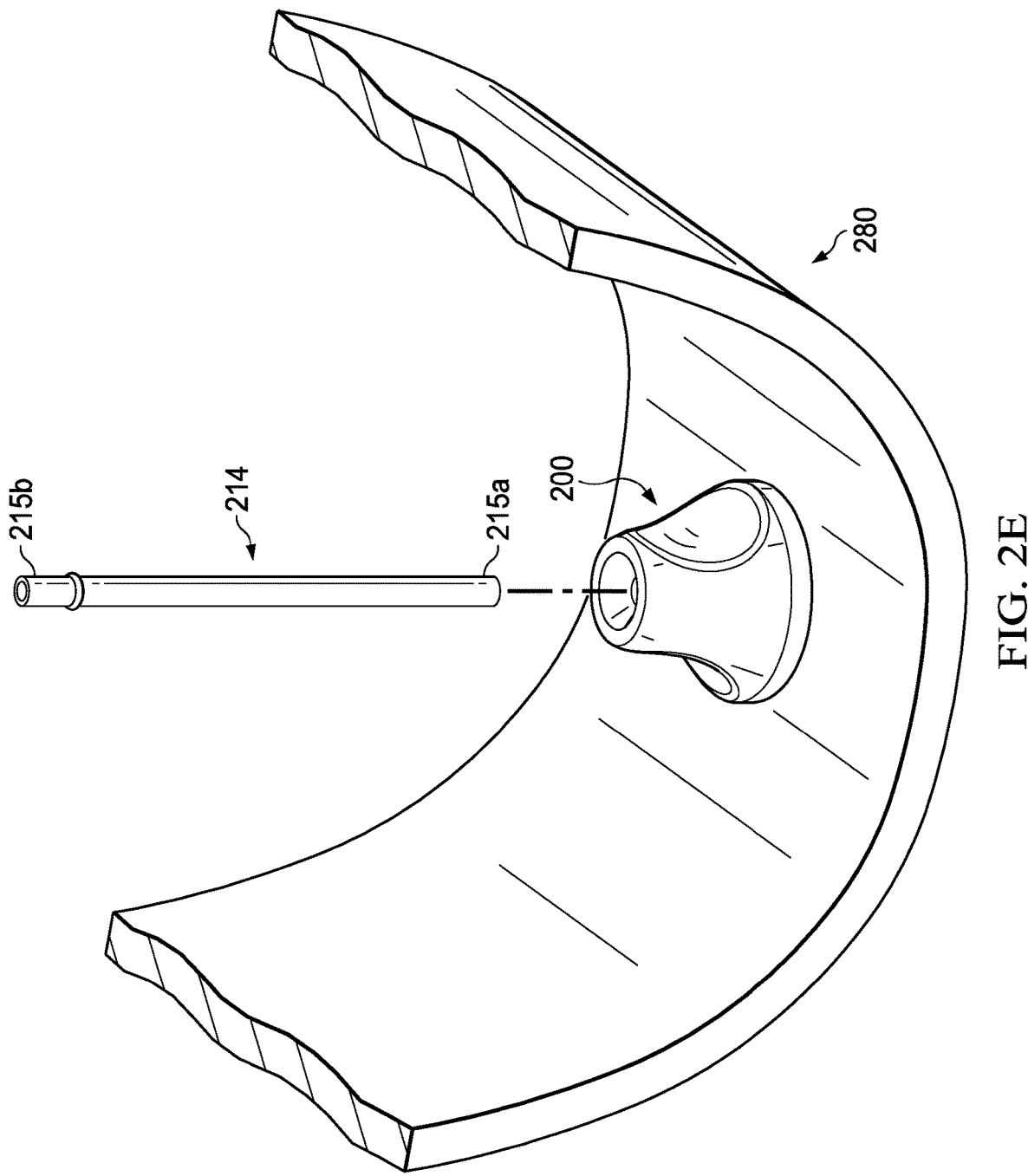

Turning to FIG. 2E, a rigid tube 214 is provided in which the rigid tube 214 includes a first insertion end 215a that is to be inserted into the hollow pathway 205 of the pressure tap support 200 and a second end 215b that is to be left exposed from the top end of the pressure tap support 200. The rigid tube 214 shown in the embodiment of FIG. 2E is straight, however, it is to be understood that it any shape can be envisioned for the rigid tube 214. The rigid tube 214 has an outer diameter that is suitable slide through the hollow pathway 205 of the pressure tap support while also providing an air tight seal between the outer diameter of the rigid tube and the inner diameter of the hollow pathway 205 when the tube is bonded in place (to enable accurate pressure measurements at the pressure port location during wind tunnel testing). In various embodiments, the rigid tube 214 may be composed of polymers, composite materials, metals, metal alloys, combinations thereof, or the like.

Figure 2F:
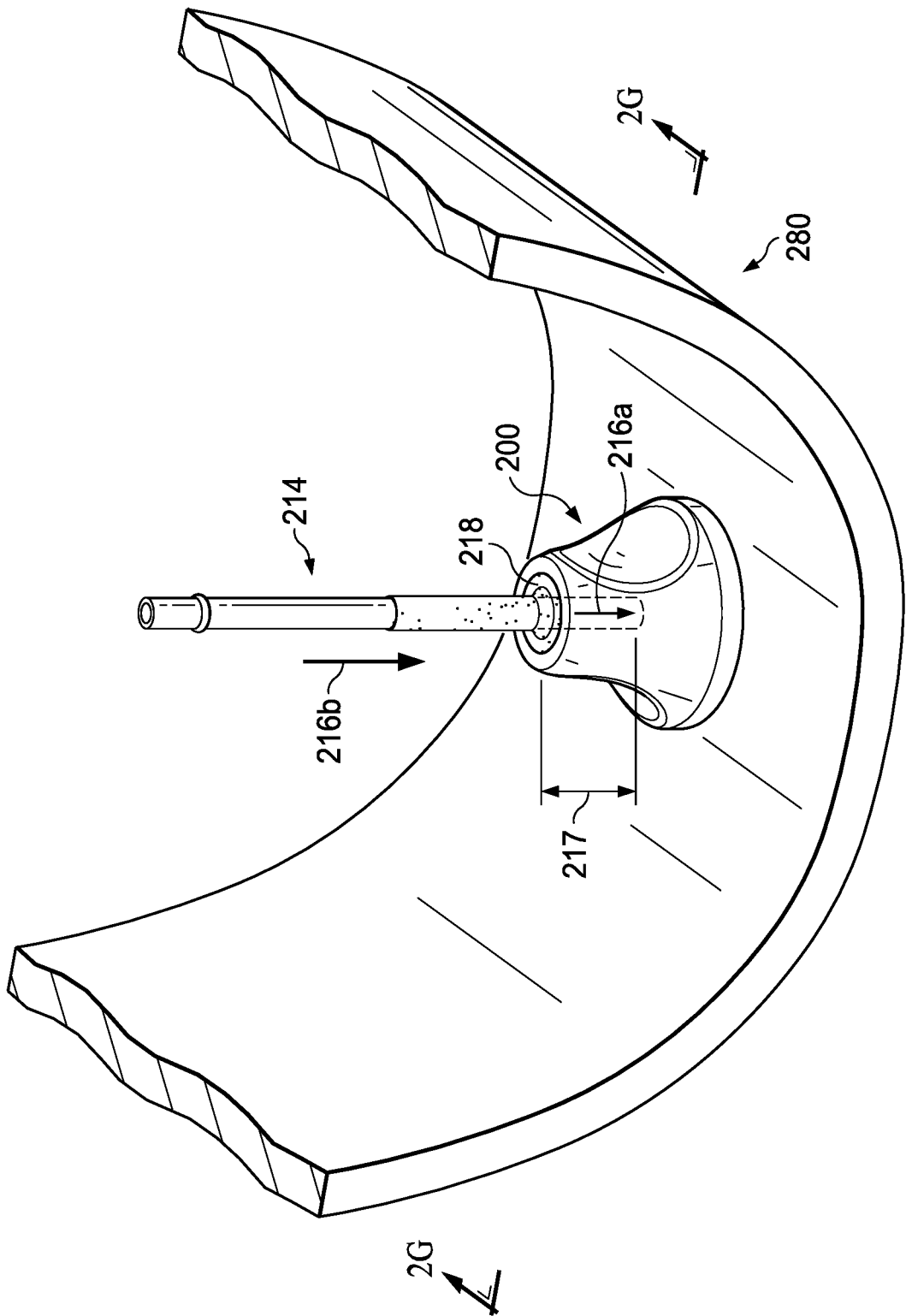

Turning to FIG. 2F, a portion of the rigid tube 214 can first be inserted 216a into the hollow pathway 205 to a first distance 217 such that the first distance 217 is less than the overall length of the pressure tap support (e.g., the new length of the pressure tap support following removal of any excess part of the tap portion). The first distance 217 can be any distance that is sufficient to avoid contaminating the inner diameter of the rigid tube 214 with adhesive (218) used to bond the rigid tube 214 to the pressure tap support.

Once the rigid tube 214 is inserted 216a to a given distance 217, an adhesive 218, which may be the same or different than adhesive 210, may be applied to the outer diameter of the rigid tube 214 and the rigid tube may continue to be inserted (216b) into the hollow pathway 205 of the pressure tap support. The adhesive 218 is used to bond the rigid tube 214 in-place once the tube is fully inserted in the pressure tap support 200. In some embodiments, adhesive can be pooled in chamfer features of a pressure tap support and the pooled adhesive can be funneled into the hollow portion of the pressure tap support as the rigid tube is further inserted into the pressure tap support.

In some embodiments, the rigid tube 214 can be inserted into the pressure tap support 200 until the insertion end 215a is flush or even with the outer surface 218b of the skin 280; however, in other embodiments, the rigid tube 214 can be inserted into the pressure tap support until the insertion end 215a exceeds the outer surface 218b of the skin 280. In some embodiments, a flat material or tool may be placed over the outer surface of a skin and corresponding hole as a rigid tube is slid through a pressure tap support in order to ensure that the tube is inserted to a point such that the insertion end is even with the outer surface of the skin. In other embodiments, any excess portion of a rigid tube that extends beyond the outer surface of a skin can be removed (e.g., cut, shaved, etc.) and any potential contaminants evacuated from the tube following the removal. Other variations for inserting a rigid tube into a pressure tap support can be envisioned. In some embodiments, additional adhesive can be applied in the chamfer feature of a pressure tap support once the rigid tube is fully inserted into the pressure tap support.

Figure 2G:
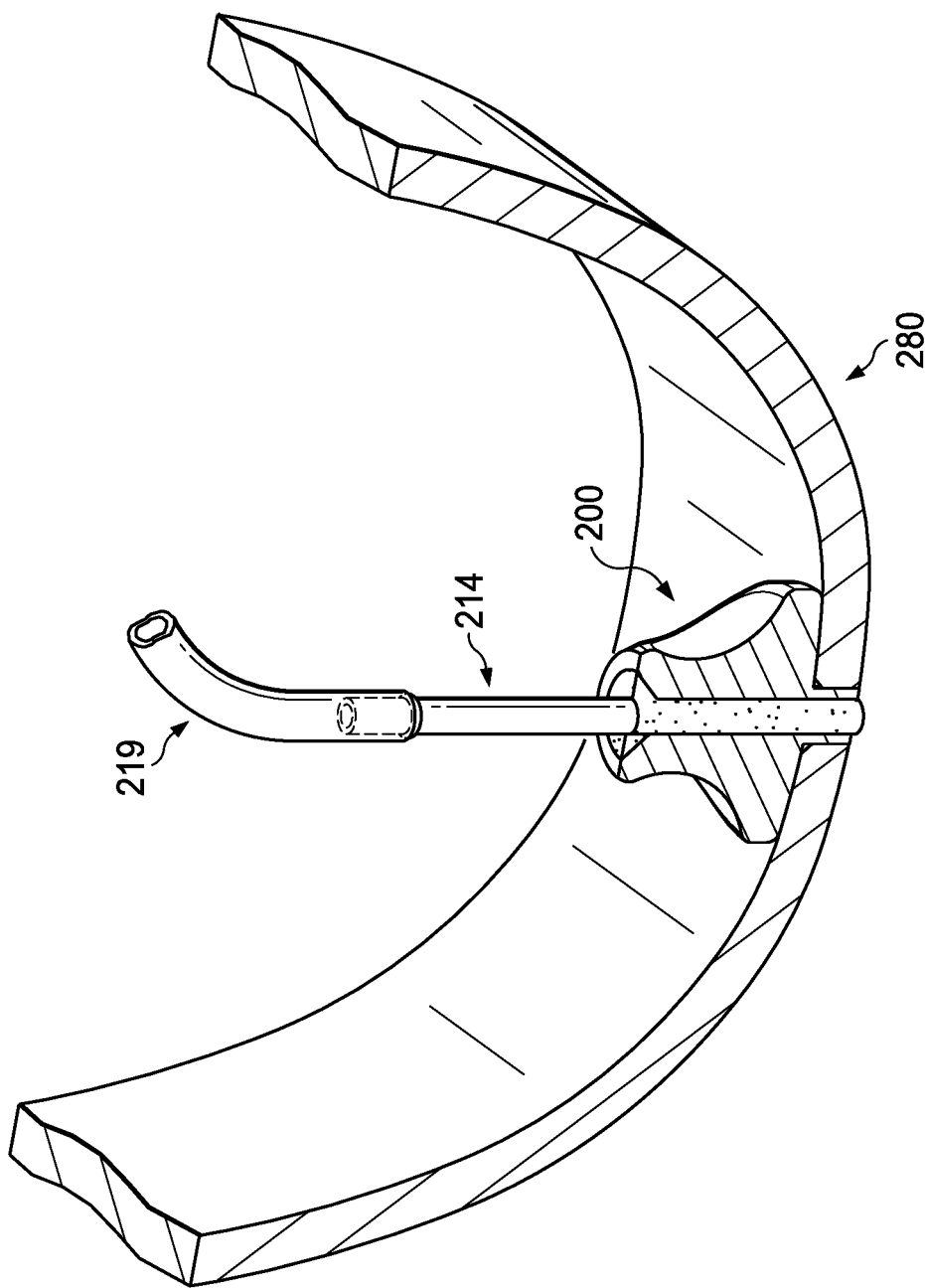

Turning to FIG. 2G, FIG. 2G is a simplified side, cross-sectional view of the installed pressure tap support 200 and rigid tube 214. The cross-section of FIG. 2G is cut along the lines labeled '2G' in FIG. 2F following full insertion (216b) of the rigid tube 214 into the pressure tap support. Once the rigid tube 214 is bonded to the pressure tap support 200 (e.g., the adhesive has hardened and/or cured), one end of a flexible tube 219 can be connected to the rigid tube 214 within the interior of model and the other end of the flexible tube 219 can be connected to a pressure measurement unit (not shown) to perform wind tunnel testing. In various embodiments, any of the operations described for FIGS. 2A-2G can be performed by any combinations of person(s) and/or a machine(s).

Figure 3A:
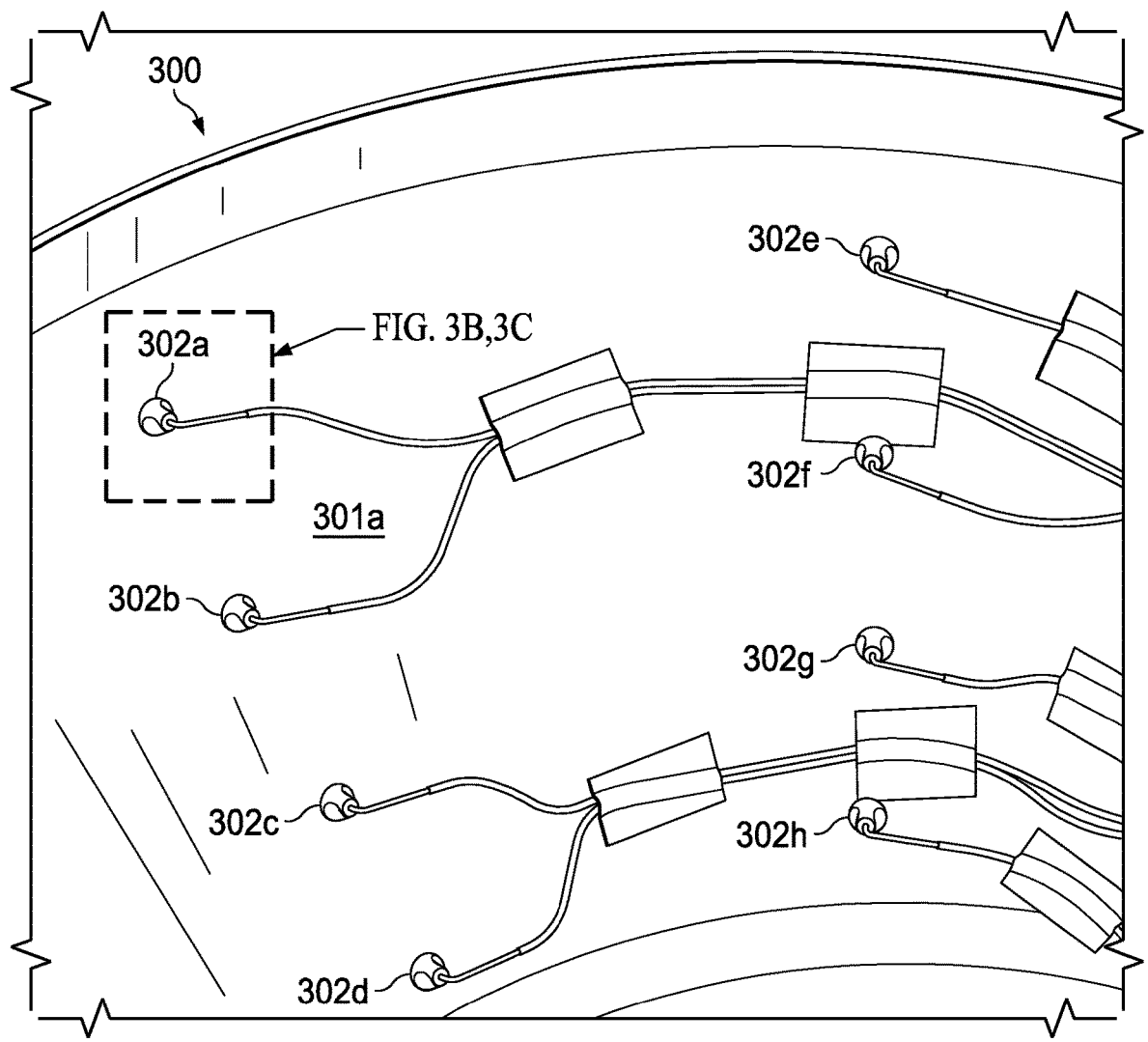
FIGS. 3A-3C are simplified diagrams illustrating example details associated with a portion of an example wind tunnel model, in accordance with certain embodiments.
Figure 3B:
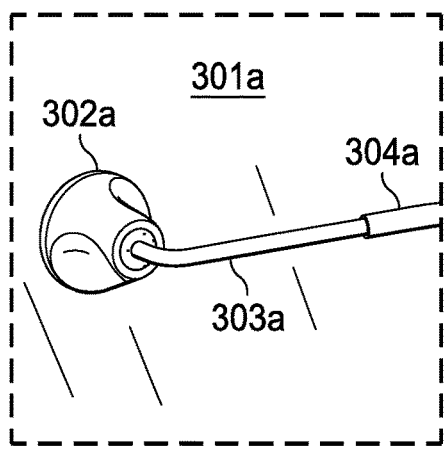
Figure 3C:
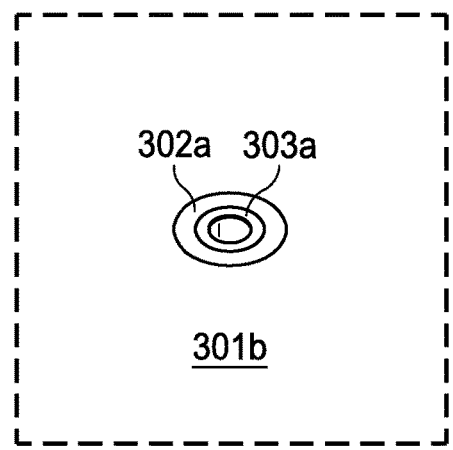

Referring to FIG. 3A, FIG. 3A is a simplified diagram illustrating example details associated with a portion of a wind tunnel model 300 in which multiple pressure tap supports 302a-302h have been installed, in accordance with certain embodiments. The pressure tap supports 302a-302h are installed on the interior of the wind tunnel model 300 and affixed to an inner surface 301a of the wind tunnel model 300. FIGS. 3B-3C are simplified diagrams illustrating example details associated with pressure tap support 302a, as generally illustrated by the area indicated by the dashed-line area labeled '3B' and '3C' in FIG. 3A. FIG. 3B illustrates a rigid tube 303a bonded-in place within the pressure tap support 302a and a rigid tube 304a connected to the rigid tube 303a. FIG. 3C illustrates the installed pressure tap support 302a and rigid tube 303a from the perspective of an outer surface 301b of the wind tunnel model 300. As illustrated in FIG. 3C, the tap portion (not labeled) of the pressure tap support 302a and the insertion end (also not labeled) of the rigid tube 303a are both flush or even with the outer surface 301b of the wind tunnel model 300 to provide a pressure port for the model.

Figure 4:
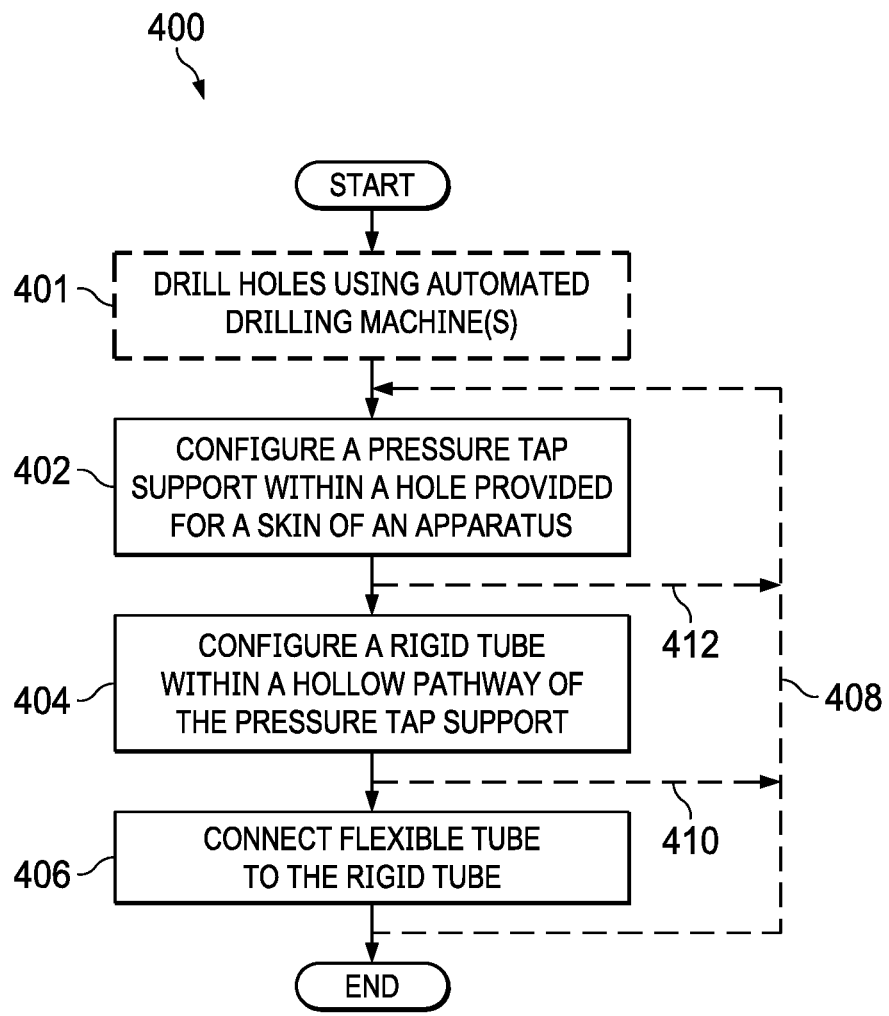
FIG. 4 is a simplified flowchart illustrating example details associated with configuring a pressure port for an apparatus, in accordance with certain embodiments.

Turning to FIG. 4, FIG. 4 is a simplified flowchart 400 illustrating example details associated with configuring a pressure port for an apparatus, in accordance with certain embodiments.

In at least one embodiment, the flowchart may begin at block 402 by configuring a pressure tap support within a hole provided for a skin of an apparatus (e.g., a wind tunnel model). However, in another embodiment, the flowchart may begin at 401 by drilling holes the skin of the apparatus using one or more automated drilling machines (e.g., CNC drilling machine(s)).

Returning to 402, configuring a pressure tap support within a hole can include inserting and bonding or otherwise affixing the pressure tap support to an inner surface of the skin using one or more adhesives. In some embodiments, configuring a pressure tap support within a hole can include removing any excess part of the pressure tap support that extends beyond the outer surface of the skin. The excess part can be removed before or after the pressure tap support is affixed to the inner surface of the skin. For example, in some cases it may be advantageous to remove the excess part before affixing the pressure tap support with the adhesive(s) in order to reduce the possibility of breaking the bond between the pressure tap support and the skin. In still other cases, any excess part of the pressure tap support may be removed at a same time that any excess part of a rigid tube within the pressure tap support is removed. In still other cases, after the support is bonded, the exterior thereof may be cut/trimmed/shaved flush with the outer mold line ('OML') or aero surface being tested.

The flowchart may proceed to 404 by configuring a rigid tube within a hollow pathway of the pressure tap support. Configuring the rigid tube can include inserting one end of the tube into the support portion of the pressure tap support and bonding or otherwise affixing the rigid tube to the pressure tap support using one or more methods as discussed herein (e.g., as discussed for FIG. 2F, etc.). In some embodiments, a flat material or tool may be placed over the outer surface of the skin to ensure that the tube is inserted into the support portion to a distance that is flush or even with the outer surface of the skin. In other embodiments, any excess part of the tube that extends beyond the outer surface of the skin can be removed before or after the tube is bonded to the pressure tap support.

The flowchart may proceed to 406 by connecting a flexible tube to an exposed end of the rigid tube that is within the apparatus. The flexible tube can be connected to the rigid tube using any suitable means or methods (e.g., friction connection, tube clamp, etc.). In some embodiments following 406, the flowchart may end.

However, in other embodiments following 406, the flowchart may be repeated after 406, as shown at 408, in order to configure additional pressure ports for the wind tunnel model. In still other embodiments, the flowchart may be repeated after 404, as shown at 410, in order to configure additional pressure ports for the wind tunnel model before connecting flexible tubes to the rigid tubes. In still other embodiments, the flowchart may be repeated after 402, as shown at 412, in order to configure additional pressure tap supports within additional holes before configuring rigid tubes within the pressure tap supports. In accordance with embodiments described herein, any combination of 402, 404, and/or 406 may be repeated in any manner at 408, 410, and/or 412.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. An apparatus comprising: a first portion comprising an inner diameter, a first outer diameter, and a first length; and a second portion, wherein the first portion and the second portion are integrally connected together, the second portion comprising: the inner diameter, at least one second outer diameter, and a second length; and a flange comprising a contact surface; and wherein the inner diameter of the first portion and the second portion provides a hollow pathway through the apparatus; and wherein the second portion comprises at least one of one or more ergonomic features to facilitate gripping the apparatus with at least two fingers and a chamfer feature at an end of the second portion that is opposite the flange, wherein the chamfer feature fully encircles the inner diameter.

2. The apparatus of claim 1, wherein the first outer diameter of the first portion is configured to be inserted in a hole, the hole comprising an outer diameter that is equal to the first outer diameter of the first portion.

3. The apparatus of claim 2, wherein the hole is within a material having a material thickness, and the first length of the first portion is greater than or equal to the material thickness.

4. The apparatus of claim 1, wherein the contact surface of the flange of extends from the first outer diameter of the first portion to a distance equal to the at least one second outer diameter.

5. The apparatus of claim 1, wherein the flange fully encircles the first outer diameter of the first portion.

6. The apparatus of claim 1, wherein the hollow pathway is configured to receive a tube, the tube comprising an outer diameter that is equal to the inner diameter of the hollow pathway.

7. A wind tunnel device comprising:
a plurality of holes configured along one or more sides of the wind tunnel device;
a plurality of pressure tap supports configured within the plurality of holes, wherein each pressure tap support comprises:
a first portion comprising an inner diameter, a first outer diameter, and a first length; and
a second portion, wherein the first portion and the second portion are integrally connected together, the second portion comprising the inner diameter, at least one second outer diameter, and a second length, and wherein the inner diameter of the first portion and the second portion provides a hollow pathway through the pressure tap support; and
a plurality of rigid tubes configured within the hollow pathway of the plurality of pressure tap supports.

8. The wind tunnel device of claim 7, further comprising:
a plurality of flexible tubes connected to the plurality of rigid tubes.

9. The wind tunnel device of claim 7, wherein the second portion of each pressure tap support further comprises a flange, and a portion of the flange is affixed to an inner surface of a skin of the wind tunnel device.

10. The wind tunnel device of claim 9, wherein the second portion of each pressure tap support further comprises a chamfer feature at an end of the second portion that is opposite the flange, wherein the chamfer feature fully encircles the inner diameter.

11. The wind tunnel device of claim 7, wherein the plurality of rigid tubes are affixed to at least a portion the pressure tap supports.

12. The wind tunnel device of claim 7, wherein an end of the first portion of each pressure tap support that extends through each hole is even with an outer surface of a skin of the wind tunnel device, and wherein an end of each tube that is configured within each pressure tap support is even with the outer surface of the side of the wind tunnel device.

13. A method comprising:
configuring a pressure tap support within a hole provided for a skin of an apparatus, wherein the pressure tap support comprises:
a first portion comprising an inner diameter, a first outer diameter, and a first length; and
a second portion, wherein the first portion and the second portion are integrally connected together, the second portion comprising the inner diameter, at least one second outer diameter, and a second length, and wherein the inner diameter of the first portion and the second portion provides a hollow pathway through the pressure tap support; and
configuring a rigid tube within the hollow pathway of the pressure tap support.

14. The method of claim 13, further comprising:
connecting a flexible tube to the rigid tube.

15. The method of claim 13, wherein configuring the pressure tap support within the hole further comprises:
affixing a flange of the second portion of the pressure tap support to an inner surface of the skin of the apparatus using at least one adhesive.

16. The method of claim 13, wherein configuring the pressure tap support within the hole further comprises:
removing any part of the first portion of the pressure tap support that extends beyond an outer surface of the skin of the apparatus.

17. The method of claim 13, wherein configuring the rigid tube within the inner diameter of the pressure tap support further comprises:
inserting an end of the rigid tube within the hollow pathway of the pressure tap support;
applying an adhesive along an outer diameter of the rigid tube; and
pushing the rigid tube within the hollow pathway of the pressure tap support until the inserted end of the rigid tube is at least even with an outer surface of the skin of the apparatus.

* * * * *